(12) United States Patent
Cheng et al.

(10) Patent No.: US 10,486,003 B2
(45) Date of Patent: Nov. 26, 2019

(54) FIREPROOFING ARTICLE AND METHOD OF MANUFACTURING THE SAME

(71) Applicant: SONY CORPORATION, Tokyo (JP)

(72) Inventors: Yih-Lin Cheng, Taipei (TW); Freeman Chen, Taipei (TW); Yu-Kai Yang, Taipei (TW)

(73) Assignee: SONY CORPORATION, Tokyo (JP)

( * ) Notice: Subject to any disclaimer, the term of this patent is extended or adjusted under 35 U.S.C. 154(b) by 11 days.

(21) Appl. No.: 15/482,295

(22) Filed: Apr. 7, 2017

(65) Prior Publication Data

US 2018/0289993 A1    Oct. 11, 2018

(51) Int. Cl.
| | |
|---|---|
| *A62C 2/06* | (2006.01) |
| *B33Y 10/00* | (2015.01) |
| *B33Y 80/00* | (2015.01) |
| *C09K 21/00* | (2006.01) |
| *C09K 21/14* | (2006.01) |
| *B29C 64/00* | (2017.01) |
| *B29K 105/00* | (2006.01) |
| *B29L 31/60* | (2006.01) |

(52) U.S. Cl.
CPC .............. *A62C 2/065* (2013.01); *B29C 64/00* (2017.08); *B33Y 10/00* (2014.12); *B33Y 80/00* (2014.12); *C09K 21/00* (2013.01); *C09K 21/14* (2013.01); *B29K 2105/0026* (2013.01); *B29K 2995/0016* (2013.01); *B29L 2031/608* (2013.01)

(58) Field of Classification Search
CPC .................... B33Y 80/00; C09K 21/00; B29K 2995/0016; B29K 2105/0026; B29L 2031/608
See application file for complete search history.

(56) References Cited

U.S. PATENT DOCUMENTS

2017/0225429 A1* 8/2017 Yu .............................. B32B 5/18

* cited by examiner

*Primary Examiner* — Robert S Jones
(74) *Attorney, Agent, or Firm* — Chip Law Group

(57) ABSTRACT

This invention relates to a fireproofing article and the method of manufacturing the same. The fireproofing article comprises an external portion and an inner portion. The external portion defines external surfaces of the fireproofing article that are exposed to the environment. The inner portion is formed inside of the external portion. The external portion and the inner portion are both porous and made of a fireproofing material. The external portion has a first material density and the inner portion has a second material density. The first material density is less than the second material density. The method of manufacturing a fireproofing article comprises forming the fireproofing article with a fireproofing material through 3D printing; wherein the fireproofing article formed is porous.

12 Claims, 3 Drawing Sheets

FIREPROOFING ARTICLE AND METHOD OF MANUFACTURING THE SAME

FIELD OF THE INVENTION

This invention relates to a fireproofing article and a method of manufacturing the same.

BACKGROUND OF THE INVENTION

Fireproofing materials are needed in various machines, plants, apparatuses and even houses in which any portion may experience high temperatures or generate flames. Most attempts to improve fireproofing materials are directed at changing or adding components to the fireproofing materials. However, the improvements that have been made by such an approach have been somewhat limited.

SUMMARY OF THE INVENTION

This invention is to provide a fireproofing article with improved fireproofing ability. The fireproofing article comprises an external portion and an inner portion. The external portion defines external surfaces of the fireproofing article that are exposed to the environment. The inner portion is formed inside of the external portion. The external portion and the inner portion are both porous and made of a fireproofing material. The external portion has a first material density and the inner portion has a second material density. The first material density is less than the second material density.

This invention is to provide a method of manufacturing a fireproofing article, comprising: forming the fireproofing article with a fireproofing material through 3D printing; wherein the fireproofing article formed is porous.

DETAILED DESCRIPTION OF THE INVENTION

Figure 1:
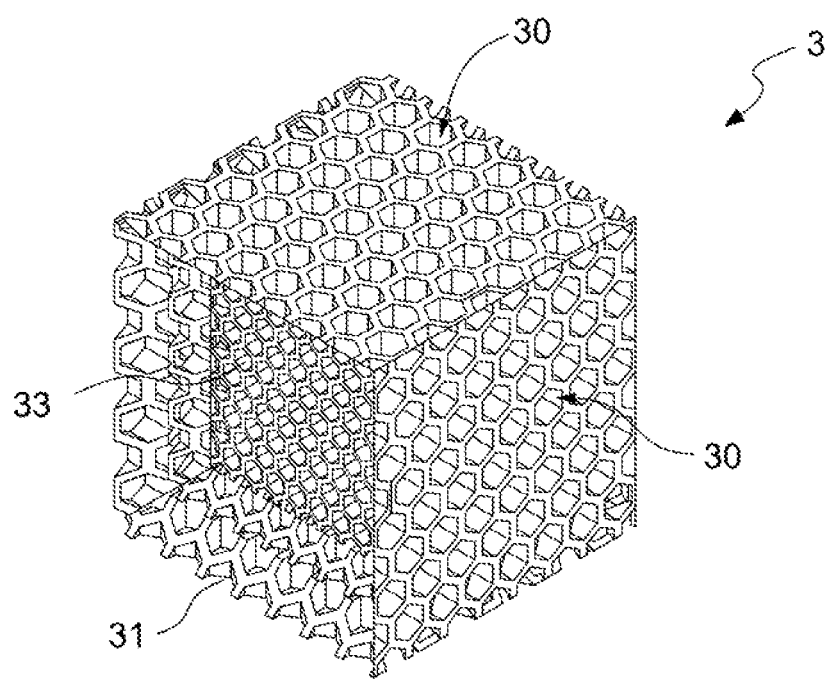
FIG. 1 is an illustrative perspective view of one embodiment of the fireproofing article.
Figure 2:
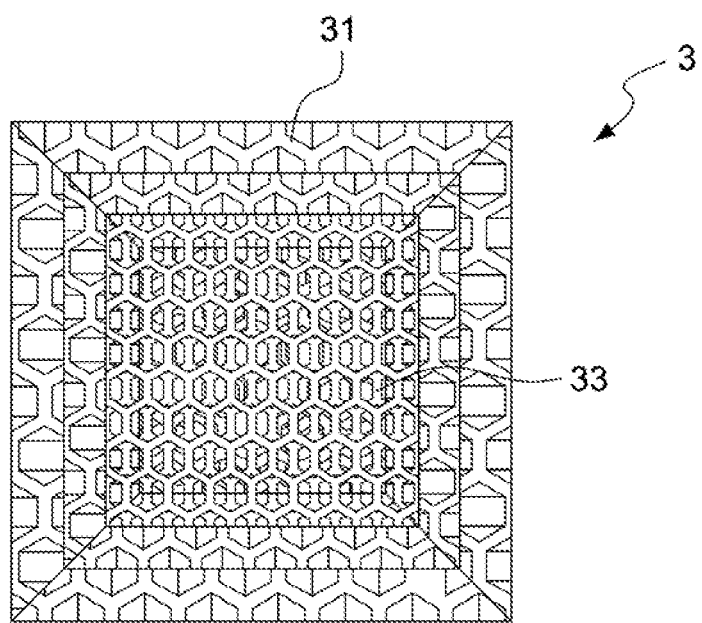
FIG. 2 is an illustrative rear view of one embodiment of the fireproofing article.

Please refer to FIGS. 1 and 2. The fireproofing article 3 of one embodiment comprises an external portion 31 and an inner portion 33. The external portion defines external surfaces 30 of the fireproofing article 3 that are exposed to the environment, which is the space outside the article. The inner portion 33 is formed inside of the external portion 31. The external portion 31 is, at least in some areas, closely connected with the inner portion 33. The external portion 31 and the inner portion 33 are both porous and made of a fireproofing material. The external portion has a first material density and the inner portion has a second material density. The first material density is less than the second material density. It should be noted that the first material density and the second material density herein refer to volume densities rather than mass densities. In a preferred condition, the fireproofing material for making the external portion 31 and that for making the inner portion 33 are the same; in such condition, the ratio of the total volume occupied by the pores/cavities to the total volume occupied by the solid portion formed by the fireproofing material in the external portion 31 is larger than the ratio of the total volume occupied by the pores/cavities to the total volume occupied by the solid portion formed by the fireproofing material in the inner portion 31. However, in other embodiments, the fireproofing materials for making the external portion 31 and that for making the inner portion 33 may be different. Because material density is inversely related to fireproofing ability, the fireproofing article 3 can provide better fireproofing ability if the first material density of the external portion 31 is reduced to be less than the second material density of the inner portion 33. Nevertheless, the fireproofing article 3 can still provide sufficient strength to the structure by adopting the higher second material density of the inner portion 33.

As shown in FIGS. 1 and 2, the porous external portion 31 and the porous inner portion 31 of this embodiment are constructed of a structure having a plurality of hollow polygonal prisms. The polygonal prisms may be one of the following: triangular prisms, rectangular prisms, pentagonal prisms, hexagonal prisms and the combination of any two of the above-mentioned prisms. In this preferred embodiment, the structure having a plurality of hollow polygonal prisms of the porous external portion 31 and the porous inner portion 31 is a uniformly formed hexagonal honeycomb structure. However, the structure of the porous external portion 31 and the structure of the porous inner portion 31 may be different.

Due to the complex structure of the fireproofing article 3 which is difficult to be formed by conventional injection molding process, the fireproofing article 3 is preferably made by 3D printing for easy manufacture. The structure of the hollow polygonal prisms of the external portion 31 and the inner portion 33 provides the external portion 31 and the inner portion 33 enough strength with reduced material density, and thus the time and material used for 3D printing can be reduced. To provide enough fireproofing ability, it is preferred that the external portion 31 have a thickness of 0.5 cm or more.

In a preferred embodiment, the fireproofing material(s) of the constructed fireproofing article 3 expands in volume when burned. More preferably, the fireproofing material(s) of the constructed fireproofing article 3, specifically the portion exposed to the air, will be carbonized to form a carbonized layer when burned. The fireproofing material may contain flame retardants of Sulfonated Polystyrene derivatives or their alkaline metal salts, phosphate flame retardants or nitrogen flame retardants. Preferably, the fireproofing material contains flame retardants of Sulfonated Polystyrene derivatives or their alkaline metal salts. Further preferably, the fireproofing material is recyclable. In one specific preferable embodiment, the fireproofing material is SORPLAS™ (Sustainable Oriented Recycled Plastic) produced by Sony Corporation™.

The first material density of the external portion 31 may range from 10 to 60% in volume. Preferably, the first material density of the external portion 31 is 10% in volume. The second material density of the inner portion 33 may range from 15 to 100% in volume. Preferably, the second material density of the inner portion 33 is 60% in volume.

Figure 3:
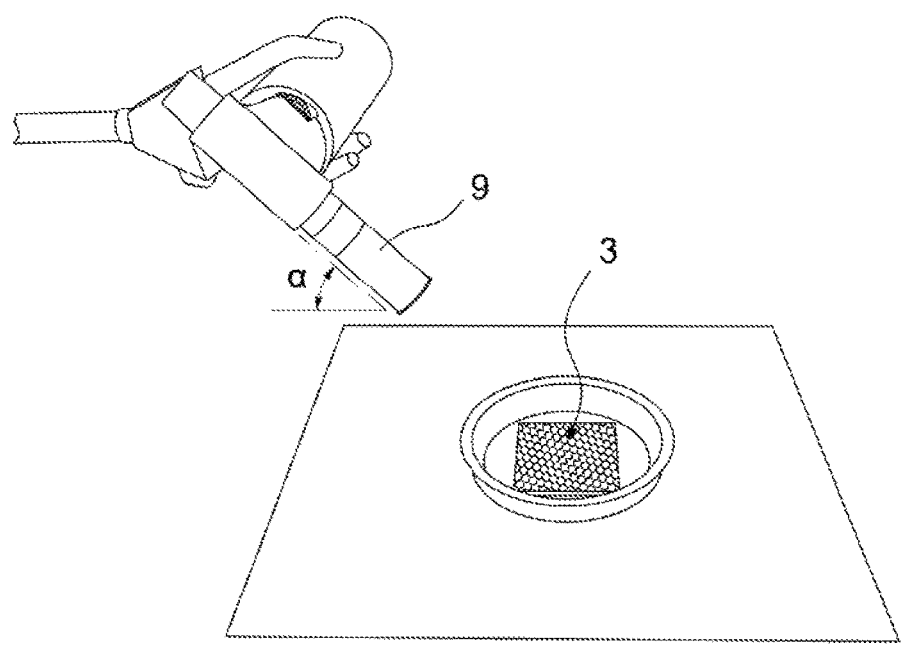
FIG. 3 is an illustrative view showing the flammability testing environment of the fireproofing article.

Please refer to FIG. 3, which is an illustration of the flammability test of the fireproofing article 3. The test conditions include as follows: 1. All samples are put in the furnace at 40° C. for 24 hours before the test. 2. The angle α between the fire source 9 and the samples of the fireproofing article 3 is 45°. 3. All samples are burned by the fire source 9 for 10 seconds initially. Then, the after-flame period (the period in which the samples are still flaming after the fire source 9 stops burning the fireproofing article 3) is counted to observe the effect of fireproofing.

Please refer to the following table (Table 1). The samples made of the abovementioned preferred fireproofing material and Acrylonitrile butadiene styrene (ABS) and with the different shapes of the hollow polygonal prisms of the porous external portion 31 and the porous inner portion 33 are tested. The counted after-flame periods are listed in the following table. In view of the following table, the fireproofing article 3 which is made of the abovementioned preferred fireproofing material and with a hexagonal honeycomb structure and a lesser material density of the porous external portion 31 will have the best fireproofing ability and stop flaming almost immediately after the fire source 9 is shut off.

TABLE 1

| | Material | | | | | | | |
|---|---|---|---|---|---|---|---|---|
| | Preferred Fireproofing Material | | | | ABS | | | |
| | Shape of the hollow polygonal prisms | | | | | | | |
| | Rectangle | | Hexagon | | Rectangle | | Hexagon | |
| First material density of the external portion | 10% | 60% | 10% | 60% | 10% | 60% | 10% | 60% |
| Time for burning the sample by the fire source | 10 s | | | | 10 s | | | |
| After-flame period | 0 s | 0.75 s | 0 s | 0 s | 16.4 s | 16.8 s | 1.3 s | 16.7 s |

The method of manufacturing a fireproofing article 3 preferably comprises forming the fireproofing article 3 with a fireproofing material through 3D printing process; the constructed fireproofing article 3 includes a lot of cavities or pores and thus is porous. The step of forming the fireproofing article 3 comprises the following steps: forming an external portion 31 of the fireproofing article 3 with the fireproofing material through 3D printing, wherein the external portion 31 defines external surfaces 30 of the fireproofing article 3 that are exposed to the environment; and forming an inner portion 33 of the fireproofing article 3 inside of the external portion 31 with the fireproofing material through 3D printing. As mentioned above, the external portion 31 has a first material density and the inner portion 33 has a second material density, and the first material density of the external portion 31 is less than the second material density of the inner portion 33.

The step of forming the fireproofing article 3 constructs for the fireproofing article 3 a structure having a plurality of hollow polygonal prisms, for example a triangular honeycomb structure, a rectangular honeycomb structure, a pentagonal honeycomb, a hexagonal honeycomb structure and a combination of any two of the above-mentioned structures. In one preferred embodiment, the step of forming the fireproofing article 3 constructs a uniform hexagonal honeycomb structure for the fireproofing article 3. To provide enough fireproofing ability, it is preferred that the external portion 31 have a thickness of 0.5 cm or more.

The fireproofing material of the constructed fireproofing article 3 preferably expands in volume when burned. More preferably, the fireproofing material of the constructed fireproofing article 3, specifically the portion exposed to the air, is carbonized to form a carbonized layer when burned. The fireproofing material may contain flame retardants of Sulfonated Polystyrene derivatives or their alkaline metal salts, phosphate flame retardants or nitrogen flame retardants. Preferably, the fireproofing material contains flame retardants of Sulfonated Polystyrene derivatives or their alkaline metal salts. Further preferably, the fireproofing material is recyclable. In one specific preferable embodiment, the fireproofing material is SORPLAS™ (Sustainable Oriented Recycled Plastic) produced by Sony Corporation™.

The first material density of the external portion 31 may range from 10 to 60% in volume. Preferably, the first material density of the external portion 31 is 10% in volume. The second material density of the inner portion 33 may range from 15 to 100% in volume. Preferably, the second material density of the inner portion 33 is 60% in volume.

What is claimed is:

1. A fireproofing article, comprising:
   an external portion defining external surfaces of the fireproofing article, wherein the external surfaces are exposed to an environment; and
   an inner portion inside the external portion, wherein
   the external portion and the inner portion are porous,
   the external portion and the inner portion comprise a fireproofing material,
   the external portion has a first material density,
   the inner portion has a second material density,
   the first material density is less than the second material density, and
   the external portion and the inner portion include a structure having a plurality of hollow polygonal prisms.

2. The fireproofing article as in claim 1, wherein the plurality of hollow polygonal prisms is one of triangular prisms, rectangular prisms, pentagonal prisms, hexagonal prisms, or a combination of any two of the triangular prisms, the rectangular prisms, the pentagonal prisms, or the hexagonal prisms.

3. The fireproofing article as in claim 1, wherein the structure is a uniformly formed hexagonal honeycomb structure.

4. The fireproofing article as in claim 1, wherein the fireproofing article is a 3D printed article.

5. The fireproofing article as in claim 1, wherein
   the fireproofing material is expandable in volume in a burning state, and
   a portion of the fireproofing material is carbonizable in the burning state.

6. The fireproofing article as in claim 1, wherein the fireproofing material contains at least one of flame retardants of Sulfonated Polystyrene derivatives, flame retardants of alkaline metal salts of Sulfonated Polystyrene derivatives, phosphate flame retardants, or nitrogen flame retardants.

7. The fireproofing article as in claim 1, wherein the fireproofing material is recyclable.

8. The fireproofing article as in claim 1, wherein the first material density of the external portion ranges from 10 to 60% in volume.

9. The fireproofing article as in claim 8, wherein the first material density of the external portion is 10% in volume.

10. The fireproofing article as in claim 1, wherein the second material density of the inner portion ranges from 15 to 100% in volume.

11. The fireproofing article as in claim 10, wherein the second material density of the inner portion is 60% in volume.

12. The fireproofing article as in claim 1, wherein the external portion has a thickness of 0.5 cm or more.

* * * * *